United States Patent
Shida

[11] Patent Number: 5,485,815
[45] Date of Patent: Jan. 23, 1996

[54] POPPET VALVE DEVICE

[75] Inventor: Toshimitsu Shida, Fujisawa, Japan

[73] Assignee: Fuji Oozx Inc., Fujisawa, Japan

[21] Appl. No.: 439,789

[22] Filed: May 12, 1995

[30] Foreign Application Priority Data

Nov. 25, 1993 [JP] Japan .................................. 5-295460

[51] Int. Cl.⁶ .................................. F01L 3/06; F01L 3/20
[52] U.S. Cl. .................................. 123/188.3; 123/188.7; 123/188.11; 251/346
[58] Field of Search ........................... 123/188.2, 188.3, 123/188.7, 188.11; 251/346

[56] References Cited

U.S. PATENT DOCUMENTS

| | | | |
|---|---|---|---|
| 2,111,549 | 3/1938 | Blanchet | 123/188.7 |
| 4,424,777 | 1/1984 | Klomp | 123/188.7 |
| 4,744,340 | 5/1988 | Kirby | 123/188.7 |
| 4,838,218 | 6/1989 | Sato et al. | 123/188.3 |
| 5,099,808 | 3/1992 | Matsuura et al. | 123/188.3 |
| 5,301,640 | 4/1994 | Barranco, Jr. | 123/188.3 |

FOREIGN PATENT DOCUMENTS

| | | | |
|---|---|---|---|
| 2622546 | 12/1976 | Germany | 123/188.11 |
| 2107706 | 8/1980 | Japan . | |
| 2041443 | 9/1980 | United Kingdom | 123/188.11 |

*Primary Examiner*—Erick R. Solis
*Attorney, Agent, or Firm*—Hoffman, Wasson & Gitler

[57] ABSTRACT

A poppet valve comprises a valve stem and a valve head which is provided at one end of the valve stem. A plurality of arcuate fins are provided on the surface of the valve head. Two semicylindrical cotters are pushed by a press member, so that the valve is driven and reciprocated. When the valve is moved upward or downward to open a port of a valve casing in which the valve is contained, fluid flows, thereby allowing fluid pressure to act on the fins, so that valve rotates little by little around its axis owing to a slight gap between the cotters and the valve stem.

7 Claims, 2 Drawing Sheets

5,485,815

POPPET VALVE DEVICE

BACKGROUND OF THE INVENTION

The present invention relates to a poppet valve device, and especially to a poppet valve device which is rotatable around its axis.

If a poppet valve of a valve operating mechanism in an internal combustion engine is rotated around its axis, it is known to solve most of valve troubles such as burning damage owing to local overheating in a valve head, local wear in a valve face and a valve stem, sticking in the valve, and adhesion of combustion products to the valve face. A valve rotator is conventionally used to rotate a valve around its axis, as disclosed in Japanese Utility Model Laid-Open Pub. No.2-107706.

However, such a valve rotator requires high accuracy of each part, complicate structure and a number of parts, thereby increasing costs. It needs relatively high weight, thereby increasing inertia mass of the valve operating mechanism, so that it is inconvenient for a high speed engine.

SUMMARY OF THE INVENTION

In order to overcome the foregoing disadvantages, it is an object of the present invention to provide a poppet valve device with simple structure, which enables a valve to rotate around its axis.

According to the present invention, there is a poppet valve device comprising a valve which comprises a valve stem and a valve head which is provided at a lower end of the valve stem, a circumferential groove being formed at an upper end of the valve stem; a valve casing having first and second ports, the valve stem being slidably fitted in the valve casing; a pair of semicylindrical cotters which are tapered downward, the cotters having a circumferential projection which is engaged in the circumferential groove of the valve stem with a small gap; a valve spring; a valve spring retainer which is urged by the valve spring, the cotters being fitted in the retainer so that the cotters and the retainer are engaged with the valve stem; a press member on the cotters; and push means for pushing the press member, the press member being pushed by the push means to press the cotters to move the valve downward so that the first port of the valve casing is opened or closed by the valve head, the valve head having a plurality of arcuate fins radially formed around its axis, thereby rotating the valve little by little by pressure of fluid which flows between the fins.

The valve is driven by pressing the pressing member to the pair of cotters, and the gap is formed between the cotters and the valve stem. Accordingly, fluid flows when the port is opened, thereby allowing fluid pressure to act on the fins of the valve to rotate the valve around its axis little by little.

The present invention provides simple structure to enable the valve to rotate by fluid pressure, and may be carried out at costs lower than a conventional valve rotator which comprises a complicate rotation mechanism for rotating the valve.

BRIEF DESCRIPTION OF THE DRAWINGS

The features and advantages of the present invention will become more apparent based on the following description with respect to the accompanying drawings wherein.

DETAILED DESCRIPTION OF PREFERRED EMBODIMENTS

Figure 1:
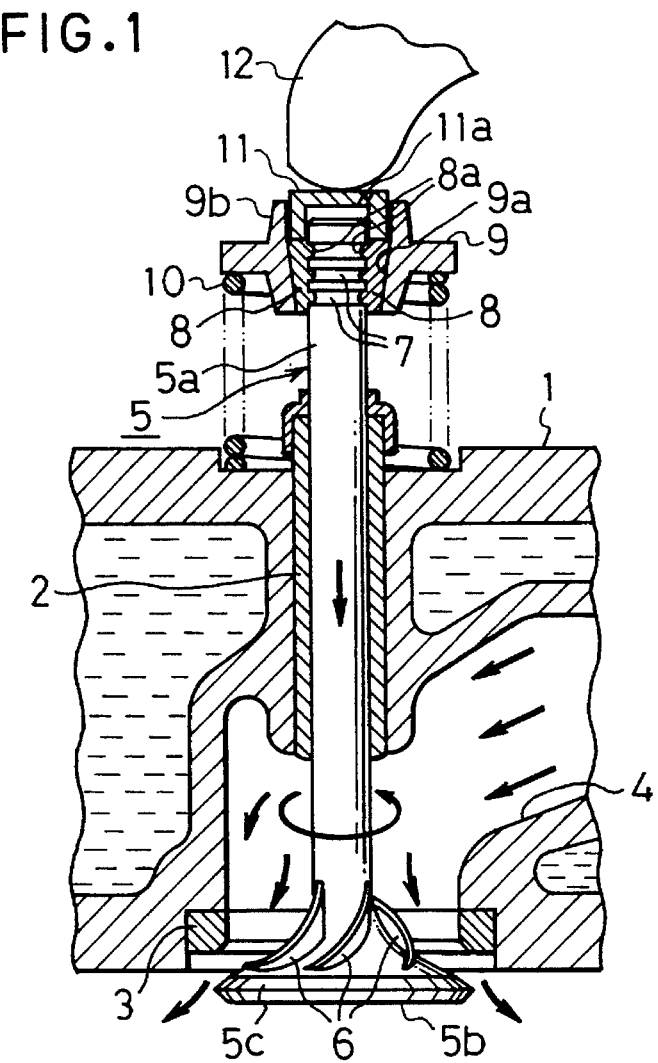
FIG. 1 is a central vertical sectioned front elevational view of the first embodiment of the present invention.

FIG. 1 illustrates the first embodiment of the present invention in which the present invention is applied to a rocker arm type valve operating mechanism. 1 denotes a cylinder head, 2 denotes a valve guide which is provided in the cylinder head 1, and 3 denotes a valve seat which is in a press fit with the lower end of an opening of an intake port 4 formed in the cylinder head 1.

A poppet valve 5 comprises a valve stem 5a and a valve head 5b. The valve stem 5a is slidably fitted in the valve guide 2. There are provided a plurality of arcuate fins 6 which are equally spaced in a radial direction around its axis from the lower end of the valve stem 5a to the valve head 5b. There are formed three circumferential grooves 7 which are equally spaced and have the same form to one another at the upper end of the valve stem 5a. At the end where the circumferential grooves 7 are formed, there are a pair of semicylindrical cotters 8 which have circumferential projections 8a to be engaged in the circumferential grooves 7 at the inner surface. The cotters 8 are gradually enlarged at the outer circumferential surface towards the upper end. The cotters 8 are tightly fitted in a tapered bore 9a of a valve spring retainer 9.

Figure 2:
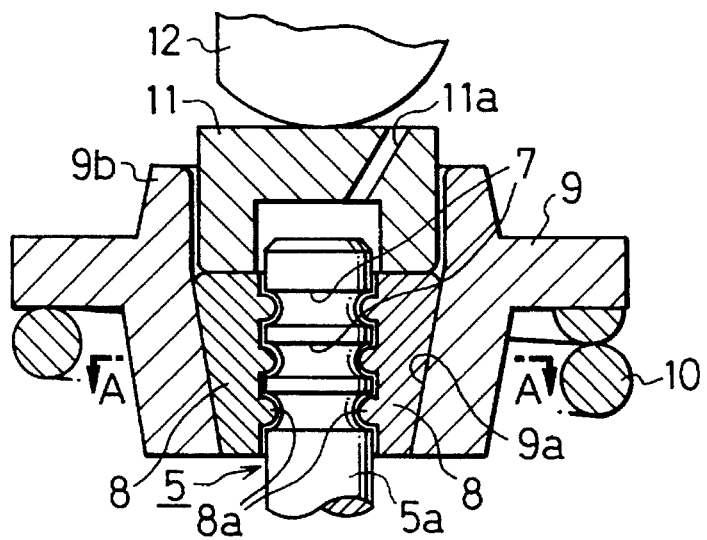
FIG. 2 is an enlarged vertical sectioned view of the end of a valve of the same.
Figure 3:
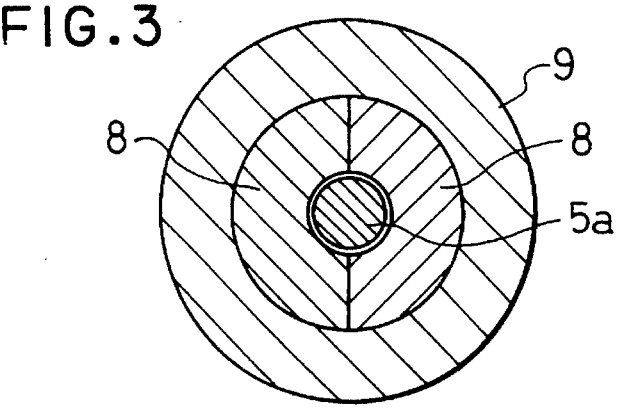
FIG. 3 is a horizontal sectioned plan view taken along the line A—A in FIG. 2.

As shown in FIGS. 2 and 3, the cotters 8 are engaged with the valve stem 5a to form a gap in radial and axial directions. The gap may be formed not to tightly bind the the valve stem 5a in the cotters 8. For example, the gap may be 0.1 to 0.2 mm radially and 0.02 to 0.05 mm axially. Accordingly, the valve 5 may be rotated with relatively low resistance at the end which is engaged in the cotters 8. 10 denotes a valve spring between the upper surface of the cylinder head 1 and the valve spring retainer 9. The valve 5 is urged upward by the valve spring 10, and the valve face 5c is engaged with a valve seat 3 to close the inlet port 4.

In a tubular guide 9b which is roughly equal to the largest outer diameter of the cotters 8, a cap-shaped press member 11 is removably provided such that its lower surface contacts the upper surface of the cotters 8. The member 11 is spaced against the axial end of the valve 5, and contacts the upper surface of the cotters 9. 11a denotes an oil guiding bore. The valve 5 is driven via the cotters 8 by the rocker arm 12 which pushes the upper surface of the press member 11.

As shown in FIG. 1, the valve 5 is opened, and a gas flows into a cylinder (not shown) through the inlet port 4. Then, the gas flows between the fins 6 on the valve head, so that the valve 5 is rotated little by little in a direction of arrows. The valve 5 is not driven by pressing it directly as a conventional valve actuating mechanism, but is driven via the cotters 8. A small gap is formed radially and axially between the cotters 8 and the valve stem 5a, so that no load is given to the valve when it is opened, whereby the valve can be rotated by pressure of the intake gas.

The first embodiment illustrates an application where the present invention is applied to a rocker arm type valve actuating mechanism, but it may be applied to a direct-acting valve operating mechanism which has a tappet (valve lifter) at the end of the valve, the upper surface of the tappet being driven by a cam. The press member 11 may be integrally formed in the inner surface of the tappet, thereby reducing the number of parts.

The second embodiment of the present invention will be described with respect to FIG. 4.

Figure 4:
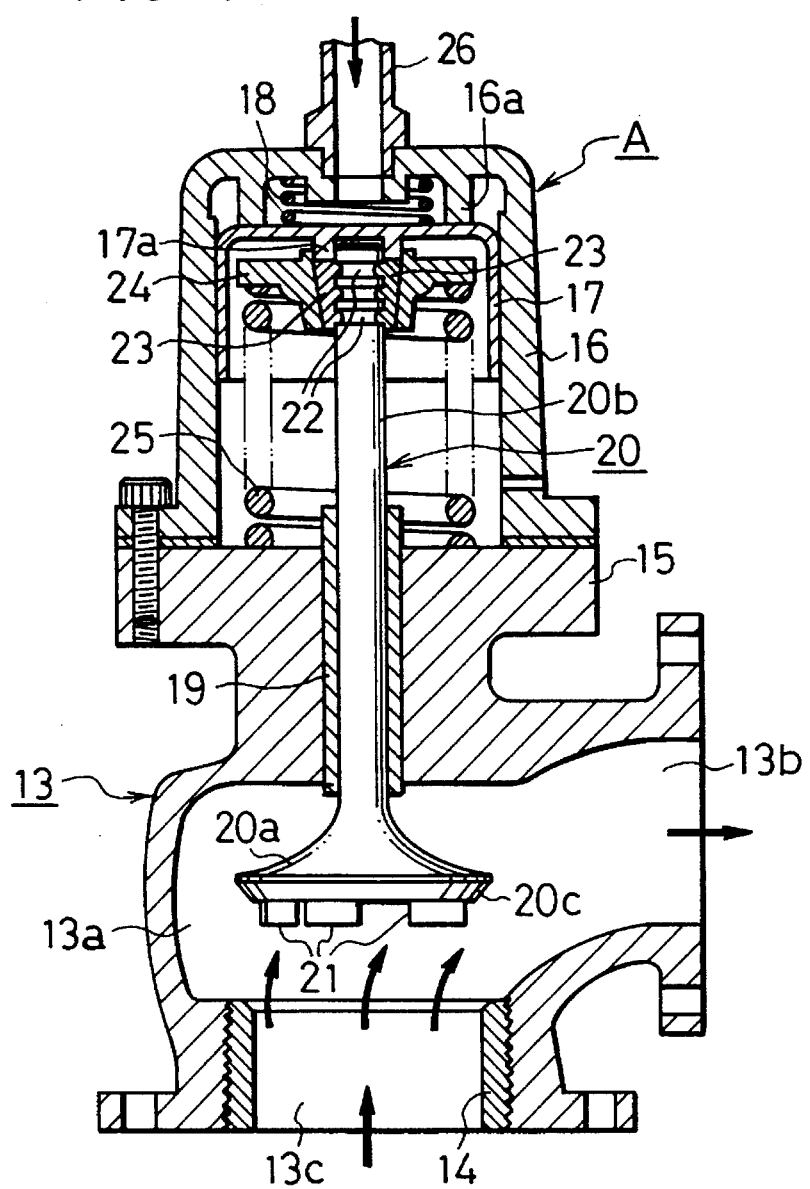
FIG. 4 is a central vertical sectioned front elevational view of the second embodiment of the present invention.

FIG. 4 illustrates a fluid control valve device such as a by-pass valve which is provided in a by-path for exhaust gas. In a valve casing 13 where a valve 20 is provided, there are provided a valve chamber 13a, an exhaust port 13b, and an inlet port 13c at the bottom. A valve seat 14 is removably in a thread fit with the inlet port 13c. On the upper surface of a support portion 15 of the valve casing 13, the lower end of a cylinder 16 of a piston-type actuator "A" is fixed by a bolt.

In the cylinder 16, there is slidably provided a piston 17 the top of which is closed. The piston 17 is urged downward by a coil spring 18 between the inner surface of the cylinder 16 and the upper surface of the piston 17. 16a denotes a stopper for limiting the highest position of the piston 17.

In the middle of the valve casing 13, a valve guide 19 is provided, and a valve stem 20b of the valve 20 is slidably engaged in the valve guide 19, the valve 20 having a valve head 20a which is moved up and down in the valve chamber 13a. On the lower surface of the head 20a, there are radially provided a plurality of arcuate fins 21.

With three circumferential grooves 22 of the upper end of the valve stem 20b in the piston 17, a pair of cotters 23 and a valve spring retainer 24 are engaged, and the valve 20 is urged upward by a coil spring 25 between the support portion 15 and the valve spring retainer 24. Between the circumferential grooves 22 and the cotters 23, there is formed a small gap in radial and axial directions, similar to the first embodiment as described above. An annular projection 17a on the inner surface of the piston 17 is engaged on the upper end of each cotter 23, and there is a small space between the upper end of the valve stem 20b and the inner surface of the piston 17.

In the by-pass valve, when compressed air is supplied into the actuator "A" through an air supply tube 26, the piston 17 is lowered, and by pushing the annular projection onto the cotters 23, the valve 20 is lowered until a tapered valve face 20c of the valve head 20a is engaged on the valve seat 14, and the inlet port 13c is closed.

When supply of compressed air stops, the valve 20 and the piston 17 are both elevated by returning force of the coil spring 25, and by engaging the upper surface of the piston 17 with the stopper 16a, the valve 20 is opened as shown in FIG. 4, so that exhaust gas is discharged via the exhaust port 13b.

When the valve 20 is opened, no load acts on the valve 20 as well as that in the first embodiment, so that the valve 20 is rotated little by little in a certain direction owing to pressure when exhaust gas strongly flows between the fins 21.

The second embodiment relates to a by-pass valve which has a piston-type actuator "A". But the present invention is, of course, applicable to a by-pass valve which has a diaphragm-type actuator, and is extensible to a by-pass valve in which the valve 20 is opened similar to FIG. 1 when it goes down, so that exhaust gas flows from the port 13b to the port 13c contrary to the above.

As described above, in the first and second embodiments, the valve is driven by the cotters 8 and 23, no load being given to the valve when it is opened, fluid pressure acting to the fins 6 and 21 of the valve head 5b and 20a so as to allow the valve to rotate little by little, thereby preventing local heating of the heads 5b and 20a, local wear of the valve faces 5c and 20c and the valve seats 3 and 14, and deficiency in air-tightness by adhesion of combustion products.

The foregoings merely relate to embodiments of the present invention, but various changes and modifications may be made by person skilled in the art without departing from the scope of claims wherein:

What is claimed is:

1. A poppet valve device comprising:

a valve which comprises a valve stem and a valve head which is provided at a lower end of the valve stem, a circumferential groove being formed at an upper end of the valve stem;

a valve casing having first and second ports, the valve stem being slidably fitted in the valve casing;

a pair of semicylindrical cotters which are tapered downward, the cotters having a circumferential projection which is engaged in the circumferential groove of the valve stem with a small gap;

a valve spring;

a valve spring retainer which is urged by the valve spring, the cotters being fitted in the retainer so that the cotters and the retainer are engaged with the valve stem;

a press member on the cotters; and push means for pushing the press member, the press member being pushed by the push means to press the cotters to move the valve downward so that the first port of the valve casing is opened or closed by the valve head, the valve head having a plurality of arcuate fins radially formed around its axis, thereby rotating the valve little by little by pressure of fluid which flows between the fins.

2. A poppet valve device as defined in claim 1 wherein the fins are provided on the valve head at an upstream side of the fluid.

3. A poppet valve device as defined in claim 2 wherein the push means comprises a rocker arm, the press member being pushed by the rocker arm so that the valve is moved downward to open the first port through which the fluid supplied through the second port is discharged, while the valve is moved upward by returning force of the valve spring to close the first port by the valve head when the press member is not pushed by the rocker arm.

4. A poppet valve device as defined in claim 2 wherein the fins are provided on an outer circumferential surface of the valve head adjacent to the valve stem.

5. A poppet valve device as defined in claim 2 wherein a small space is formed between the inner surface of the press member and the upper end of the valve stem, an oil guiding bore being formed in the press member, oil introduced through the bore being guided via the small space into the gap between the valve stem and the cotters to assure smooth rotation of the valve.

6. A poppet valve device as defined in claim 2 wherein the fins are provided on a lower surface of the valve head.

7. A poppet valve device as defined in claim 2 wherein the push means comprises compression air fed through an air supply tube, the press member comprising a piston, the air introduced through the tube pushing a piston which contacts the cotters so that the valve is moved downward to close the first port by the valve head, while the valve is moved upward by returning force of the valve spring to open the first port through which the fluid is introduced and discharged through the second port, when the air is not supplied.

* * * * *